United States Patent [19]

Lieberman et al.

[11] 4,077,503

[45] Mar. 7, 1978

[54] KNOB AND CONTROL SHAFT ASSEMBLY

[75] Inventors: Lester Lieberman, Kings Point; Ralph Oddo, Dix Hills, both of N.Y.

[73] Assignee: Jan Hardware Manufacturing Co., Inc., New York, N.Y.

[21] Appl. No.: 713,413

[22] Filed: Aug. 11, 1976

[51] Int. Cl.² .................. G05G 1/02; F16D 67/02
[52] U.S. Cl. .................. 192/18 R; 192/95; 74/554
[58] Field of Search .................. 192/95, 18 R, 8 R; 74/548, 554

[56] References Cited

U.S. PATENT DOCUMENTS

| | | | |
|---|---|---|---|
| 2,787,353 | 4/1957 | Spraragen | 192/8 R |
| 2,829,538 | 4/1958 | Mueller | 192/67 R X |
| 3,873,066 | 3/1975 | Opyrchal | 192/8 R |
| 3,986,409 | 10/1976 | Tripp et al. | 192/95 |

*Primary Examiner*—Benjamin W. Wyche
*Attorney, Agent, or Firm*—J. B. Felshin

[57] ABSTRACT

This knob assembly comprises a knob housing slidable on a body contained therein, and fixed to a centrally located control shaft. The body has means controlled by springs, to frictionally engage a disc non-rotatably keyed to a panel for said control shaft. Normally the knob housing can be freely spun, but when it is pushed in, it is lockingly engaged with the body whereby rotation of the pushed in knob housing will rotate the shaft with friction drag imposed on rotation of the shaft to thereby prevent inadvertent rotation of the shaft after setting of the angular position of the shaft. A spring causes the knob housing to pull out to disengage the knob housing from the body, to allow the knob housing to substantially spin freely again. The springs which cause friction between the body and the keyed disc, are stronger than the spring which pulls the knob housing out or returns it to normal when the knob housing is released. To assemble the knob housing with the control shaft, the disc is first non-rotatably keyed to the control shaft panel. The knob housing is then pushed toward the panel, compressing the springs which impose friction drag on the disc, thereby reducing clearance between the disc and body, while the knob housing is pushed in. The body is fixed to the shaft to maintain the close clearance condition between the body and the disc when the forward pressure on the knob housing is thereafter released. The knob housing return spring disengages the knob housing from the body. A retaining ring on the knob housing engages the disc to limit its outward movement when pressure on the knob housing is released.

19 Claims, 5 Drawing Figures

KNOB AND CONTROL SHAFT ASSEMBLY

This invention relates to control shaft knob assemblies,

An object of this invention is to provide an assembly of the character described, comprising a knob housing slidably mounted on a central control shaft fixed in a body contained in the knob housing. The knob housing when extended, normally substantially freely swings on the body and shaft. When the knob housing is pushed in, it is lockingly engaged with the body to rotate it. Friction retarding means is interposed between the body and a disc non-rotatably mounted on the control shaft panel, so that when the knob body is pushed in and turned, it will turn the shaft with a friction drag applied to the shaft to prevent inadvertent motion of the shaft after setting the angular position of the shaft.

Another object of this invention is to provide spring means between the body and knob housing to extend the knob housing when pressure on the knob housing is released.

Yet another object of this invention is to provide a knob assembly of the character described, comprising friction retarding or drag means between the body and disc controlled by springs interposed between said body and disc.

Still another object of this invention is to provide a knob assembly of the character described in which the springs which are interposed between the body and disc are stronger than the spring which is interposed between the body and knob housing whereby friction is at all times maintained between the body fixed to the shaft and the disc, while the extended knob body can turn easily.

A further object of this invention is to provide a knob assembly of the character described in which a retainer ring on the knob housing engages the disc to limit outward movement of the knob housing relative to the shaft and body.

Still a further object of this invention is to provide a knob assembly of the character described in which the body is fixed to the control shaft by radial set screws, the outer ends of which terminate short of the knob housing and said housing having through holes that can register with the screw holes in the body in which the set screws are screwed, so that when the through holes in the knob housing register with the screw threaded holes in the body, a screw driver can be inserted in said through holes in the knob housing to turn said set screws.

Yet a further object of this invention is to provide an insert molded into the knob housing and having means to lockingly engage cooperative means on the body and engageable therewith when the knob housing is pushed in to permit turning of the pushed in knob housing to turn the body and shaft against the retarding drag imposed on the body.

Yet a further object of this invention is to provide a strong, durable and compact knob assembly of the character described in which the working parts are housed in the knob housing, which shall be relatively inexpensive to manufacture and yet easy to assemble and manipulate and practical and efficient to a high degree.

Other objects of this invention will in part be obvious and in part hereinafter pointed out.

The invention accordingly consists in the features of construction, combinations of elements, and arrangement of parts which will be exemplified in the construction hereinafter described and of which the scope of invention will be indicated in the following claims.

IN THE DRAWINGS

Figure 1:
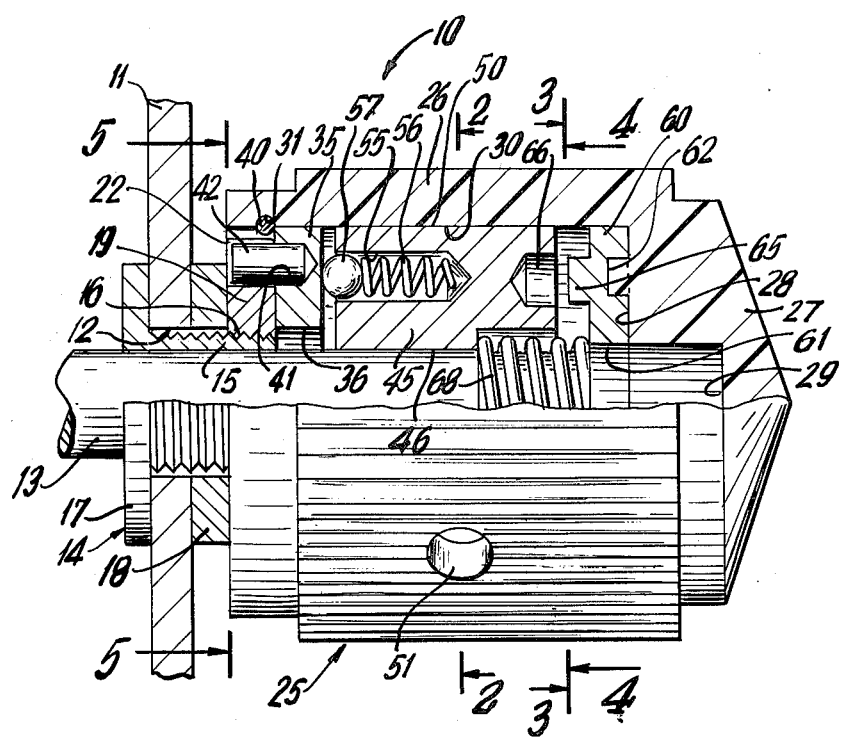
FIG. 1 is a side elevational view of a knob assembly embodying the invention mounted on a control panel, and with parts broken away and in cross-section.
Figure 2:
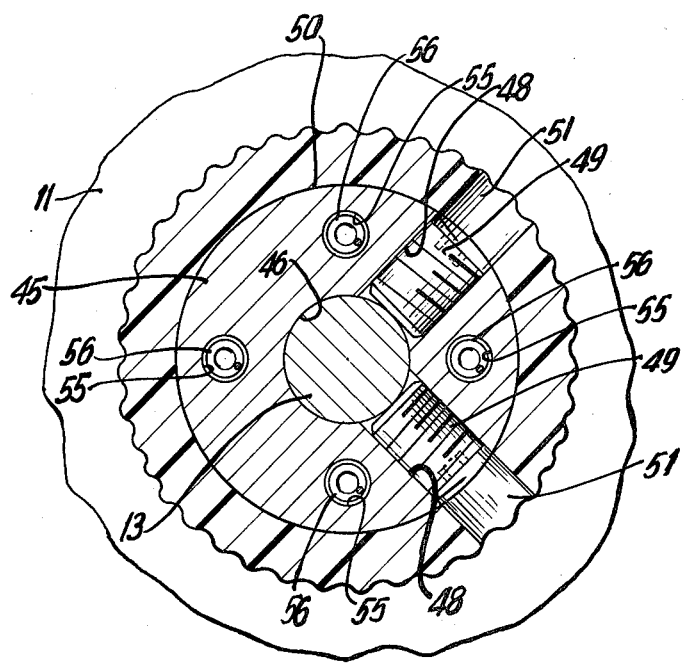
FIG. 2 is a cross-sectional view taken on line 2—2 of FIG. 1.
Figure 3:
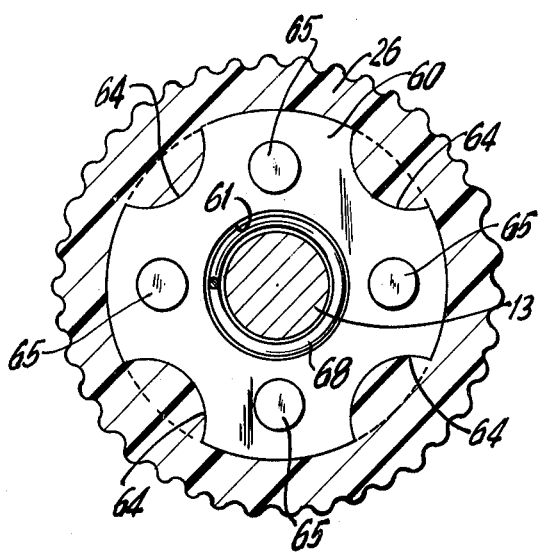
FIG. 3 is a cross-sectional veiw taken on line 3—3 of FIG. 1.
Figure 4:
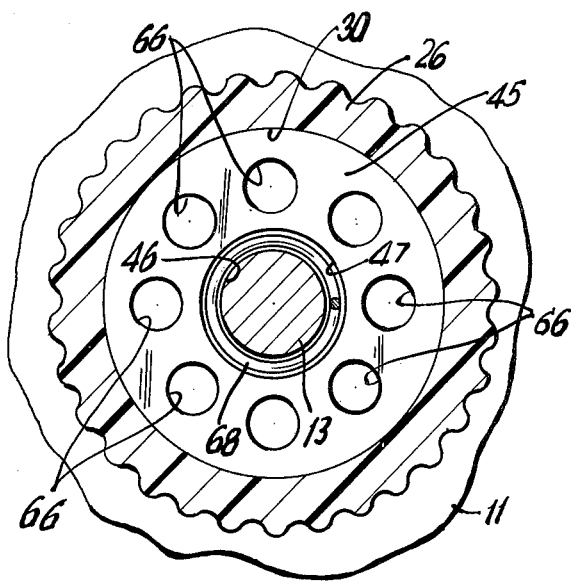
FIG. 4 is a cross-sectional view taken on line 4—4 of FIG. 1.
Figure 5:
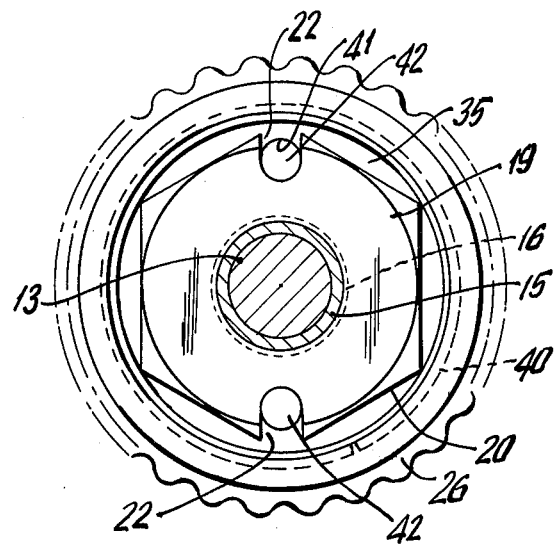
FIG. 5 is a cross-sectional view taken on line 5—5 of FIG. 1.

Referring now in detail to the drawing, 10 designates a knob assembly embodying the invention mounted on a control panel 11 formed with an opening 12 through which a shaft 13 for a control (not shown) but mounted on the panel, passes. The shaft 13 is journalled in a sleeve 14 comprising a cylindrical tube 15 loosely passing through opening 12 and having a smooth bore to rotatably receive the shaft, said tube being externally threaded as at 16 for the purpose hereinafter explained. Extending from one end of tube 15 is an annular flange 17 contacting the outer surface of the panel 11. On said tube 15 there is fitted a washer 18 contacting the inner surface of said panel 11. Screwed onto said externally threaded tube 15 of sleeve 14 is a nut 19 which has a polygonal outer periphery 20, such as hexagonal. Said nut is formed with a pair of diametrically opposed symmetrical notches 22 at the outer edge thereof. Said nut 19 is screwed tight against the washer 18 to fix the sleeve 14, washer 18 and nut 19 to the panel 11.

The knob assembly 10 surrounds and encloses the end portion of shaft 13 which passes beyond the panel 11. The nut 19 is part of the assembly. Said assembly further comprises a knob housing 25. Said housing 25 comprises a cylindrical wall 26 open at the end thereof facing the panel. At the other end of said wall 26 is an end wall 27 having an inner face 28 and a central inner blind recess 29. Said wall 26 is concentric with the axis of shaft 13. Cylinder 26 has an inner cylindrical surface 30 and is formed with an inner annular groove 31 of semicircular transverse cross-section in spaced relation to the open end of said cylinder. Disposed in the knob housing 25 is an annular ring disc 35 having a central hole 36 through which the shaft 13 passes with clearance. Disc 35 contacts nut 19.

In annular groove 31 is a split retaining ring 40 abutting the disc 35 to keep it against moving further toward the open end of the knob housing and to keep the knob housing from moving rearwardly.

Said disc is formed with a pair of diametrically opposed blind holes 41 receiving pins 42 passing through the ring 40 and projecting into the notches 22. Knob housing 25 may rotate about the disc 35, but said disc cannot rotate because it is keyed to the nut 19 by the pins 42.

Disposed within the knob housing, between the disc 35 and the wall 27 of the knob housing, is a body 45. Said body 45 has an axial bore 46 through which shaft 13 passes. Said bore 46 is counterbored at its end which faces wall 27, as at 47, for the purpose hereinafter explained. Said body 45 is formed with a pair of radial internally threaded openings 48 spaced 90° apart, to receive set screws 49 screwed thereinto and against the shaft 13 to fix the body to the shaft against rotation and longitudinal movement. The outer ends of the set screws terminate short of the outer surface 50 of the body. Cylindrical wall 26 of the knob housing has radial holes 51 adapted to register with holes 48 to allow application of a screw driver for unscrewing the set screws.

Said body 45 is formed at its end which faces disc 35 with four equiangularly spaced blind longitudinal, symmetrically disposed holes 55 receiving coil compression springs 56 pressing balls 57 against the rear surface of disc 35 to thereby create a friction drag to retard rotary movement of the body 45 and shaft 13 relative to the fixed disc 35.

Disposed in the knob housing 25 and against the inner face 28 of wall 27 is a fixed metal ring insert 60 having a central hole 61 registering with hole 29. Said insert 60 has four recesses 62 in its rear surface. Said recesses are equiangularly spaced apart. The knob housing 25 is molded with the ring 60 in the mold so that during molding of the knob housing, plastic material will enter the recesses 62 to fix the insert to the knob housing. The ring 60 also may have scalloped outer edge notches 64 to receive plastic material during the molding of the knob housing to insure a rigid fixed relation between the knob housing and the ring.

At its forward surface, said insert is formed with four equiangularly spaced pin projections 65 all on a similar radius.

The body 45 is formed at its rear surface with eight equiangularly spaced blind holes 66 on the same radius as pins 65 from the axis of the shaft, and adapted to receive the four pins 65 in four holes 66.

A coil compression spring 68 surrounds shaft 13 and is disposed in the counterbore 47 between the end surface of the counterbore and ring insert 60 to normally keep the knob housing extended with the pins 65 out of holes 66. In such position the knob housing can be spun or turned freely while the shaft 13 and body 45 do not move. To rotate the shaft, the knob housing 25 must be pushed to the left, looking at FIG. 1, toward the panel thereby engaging four pins 65 in four of the holes 66. Then the knob housing can be turned to rotate the body 45 and hence the shaft 13. During such turning movement, a friction retardation or drag is imposed on the shaft 13 due to pressure of balls 57 on disc 35. This friction also keeps the body and shaft against rotation in case the knob housing is turned without being first pushed in.

The most that the knob housing has to be turned to engage four pins 65 in four holes 66 is 22.5° since there are four pins 65 but eight holes 66.

It will now be understood that the knob assembly 10 provides a drag on the control shaft to prevent inadvertent motion of the shaft after setting.

The four springs 56 are much stronger than the knob housing return spring 68. Before assembly to the control shaft 13, the body 45 is engaged with the knob ring insert projections 65. The springs 56 bear against the balls 57 which in turn bear against the disc 35 and the knob housing return spring is compressed.

The entire assembly is contained within the knob housing by the retaining ring 40.

To assemble the knob assembly to a control shaft, the pins 42 are first engaged with the nut 19. The knob housing is then pushed in toward the panel, compressing the springs 56 and reducing the clearance between the rear face of the disc 35 and body 45. It should be noted that the opposite face of disc 35 rests on the nut 19. While the knob housing is pushed in, the set screws 49 are locked against the shaft, which maintains the compressed clearance condition between the disc 35 and the body. When the forward pressure of the knob housing is released, the knob housing return spring separates the knob insert projections 65 from the body 45. The retaining ring 40 restricts the knob housing in this motion when it banks against the disc 35.

It will thus be seen that there is provided a device in which the several objects of this invention are achieved and which is well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative.

We claim:

1. A knob assembly comprising a knob housing having a tubular wall open at one end and closed at the other end by an end wall, a body housed in the knob housing and having an axial passage to receive a control shaft, said housing being slidable on said body, means on the body to attach said body to a control shaft in said passage, for rotation therewith, spring means within said knob housing and interposed between the body and the end wall of said knob housing, to slidably move said housing relative to said body outwardly to a predetermined extended position, said knob housing, in said extended position, being rotatable on and relative to said body through a substantial angle and without rotating said body, disengageable cooperating lock means on said knob housing and body, to lock said housing to said body against rotation relative thereto, when said housing is pushed-in longitudinally of the body in a direction to compress said spring means, so that rotation of said housing, after being pushed-in, will be accompanied by rotation of said body, and rotation of a control shaft in said passage and attached to said body, together with said body, and whereby upon relieving push-in pressure on the housing, said housing will be moved in an opposite direction by said spring means to disengage said lock means, a fixed member disposed in said knob housing, said body being interposed between said fixed member and end wall, and cooperative means on said body and fixed member and disposed within said knob housing and between said body and fixed member, independently of said spring means, and independently of a control shaft being received within said axial pressure in said body and of attachment of such shaft to said body by said means on the body to attach said body to said control shaft, to impose a friction drag on said body to retard rotation of said body relative to said fixed member upon pushing-in said knob housing and rotating said knob housing while said knob housing is in pushed-in condition.

2. The combination of claim 1, said means to impose a retarding drag, comprising spring pressed balls on said body impinging on said fixed member.

3. The combination of claim 1, said disengageable cooperating means on said body and knob housing comprising projections on one of them receivable in holes formed in the other of them.

4. The combination of claim 3, said projections being part of a metal insert embedded in the knob housing, and said knob housing comprising molded plastic.

5. The combination of claim 1, said disengageable cooperating means on said knob housing and body comprising projections on one of them receivable in holes in the other of them, said means to impose a retarding drag, comprising spring pressed balls on said body impinging on said fixed member.

6. The combination of claim 5, said projections being part of a metal insert embedded in the knob housing, and said housing comprising molded plastic.

7. The combination of claim 1, and a control shaft in said passage.

8. The combination of claim 7, a sleeve on said shaft, a nut screwed to said sleeve and means to key said fixed member to said nut.

9. The combination of claim 8, a panel and means to fix said sleeve and nut to said panel.

10. The combination of claim 9, said fixed member contacting said nut.

11. The combination of claim 10, said tubular wall of said housing having an internal annular groove and a retaining ring in said groove and projecting radially inwardly thereof and contacting said member to hold said fixed member within said housing.

12. The combination of claim 1, said tubular wall of said housing having an internal annular groove and a retaining ring in said groove and projecting radially inwardly thereof and contacting said member to hold said fixed member within said housing.

13. The combination of claim 12, said retarding means comprising spring pressed balls on said body impinging on said fixed member.

14. The combination of claim 13, said disengageable cooperating means comprising projections on said knob housing receivable in holes in said body.

15. The combination of claim 14, said projections being part of a metal insert embedded in the knob housing and against the end wall thereof, and said housing comprising molded plastic.

16. The combination of claim 1, said retarding means comprising spring pressed balls on said body impinging on said fixed member, said disengageable cooperating means comprising projections on said knob housing receivable in holes in said body.

17. The combination of claim 1, and means to fix said fixed member within said housing.

18. The combination of claim 1, and means to retain said knob housing in said predetermined extended position.

19. The combination of claim 18, said means to retain said knob housing in said predetermined extended position comprising a split ring disposed in an internal groove in said tubular wall adjacent the open end of said tubular wall, and engaging said fixed member to retain said fixed member within said housing.

* * * * *